(12) United States Patent
Kimura et al.

(10) Patent No.: US 8,086,086 B2
(45) Date of Patent: Dec. 27, 2011

(54) INFORMATION PROCESSING APPARATUS, INFORMATION PROCESSING METHOD, AND COMPUTER PROGRAM

(75) Inventors: Hitoshi Kimura, Kanagawa (JP); Kensuke Ohnuma, Tokyo (JP); Hiroshi Okuda, Tokyo (JP); Hidetoshi Ichioka, Tokyo (JP)

(73) Assignee: Sony Corporation, Tokyo (JP)

( * ) Notice: Subject to any disclaimer, the term of this patent is extended or adjusted under 35 U.S.C. 154(b) by 950 days.

(21) Appl. No.: 11/149,213

(22) Filed: Jun. 10, 2005

(65) Prior Publication Data

US 2005/0283803 A1  Dec. 22, 2005

(30) Foreign Application Priority Data

Jun. 16, 2004 (JP) ................................ 2004-177791

(51) Int. Cl.
*H04N 5/765* (2006.01)
*H04N 5/932* (2006.01)

(52) U.S. Cl. ........................................ 386/200; 386/216

(58) Field of Classification Search ............... 386/46
See application file for complete search history.

(56) References Cited

U.S. PATENT DOCUMENTS

| 7,007,067 B1 * | 2/2006 | Azvine et al. | 709/206 |
| 2002/0077899 A1 * | 6/2002 | Kaneko et al. | 705/14 |
| 2002/0140728 A1 | 10/2002 | Zimmerman | |
| 2004/0126091 A1 * | 7/2004 | Sieben et al. | 386/52 |
| 2004/0128286 A1 * | 7/2004 | Yasushi et al. | 707/3 |
| 2006/0173562 A1 * | 8/2006 | Verhaegh et al. | 700/86 |

FOREIGN PATENT DOCUMENTS

| JP | 8-329558 | 12/1996 |
| JP | 2000-13708 | 1/2000 |
| JP | 2002-112186 | 4/2002 |
| JP | 2002-305706 | 10/2002 |
| JP | 2002-374462 | 12/2002 |
| JP | 2003-23589 | 1/2003 |
| JP | 2004-15528 | 1/2004 |
| JP | 2004-72502 | 3/2004 |
| WO | WO-02/42959 A2 | 5/2002 |
| WO | WO-02/47387 A2 | 6/2002 |
| WO | WO-02/47387 A3 | 6/2002 |

\* cited by examiner

*Primary Examiner* — William Vaughn, Jr.
*Assistant Examiner* — Oluwaseun A Adegeye
(74) *Attorney, Agent, or Firm* — Oblon, Spivak, McClelland, Maier & Neustadt, L.L.P.

(57) ABSTRACT

The present invention is intended to provide an apparatus and a method for realizing the presentation of a content list and the reproduction of content in accordance with proper user preference on the basis of date and time at which content is viewed. Content preference values that change with time are computed. On the basis of the computed content preference values, a content list is generated for presentation to the user. For example, preference values are computed on the basis of daily time zone, holiday, weekday, and day-of-the-week and a content list in accordance with the computed preference values is generated for presentation to the user. The novel configuration allows the presentation of an optimum content list on the basis of date and time at which content is viewed, thereby realizing the selection and viewing of content that properly reflects user preference.

14 Claims, 12 Drawing Sheets

FIG. 9

| GENRE | C1 | D1 | C2 | D2 |
|---|---|---|---|---|
| NEWS | -2.0 | 120.0 | -2.0 | -50.0 |
| SPORTS | -1.0 | 110.0 | -1.0 | -50.0 |
| MOVIE | 0.0 | 100.0 | -0.1 | -50.0 |
| DRAMA | 0.0 | 100.0 | -0.1 | -50.0 |
| ANIME | 0.0 | 100.0 | -0.1 | -50.0 |
| MUSIC | -0.1 | 100.0 | -0.1 | -50.0 |
| VARIETY | -0.5 | 100.0 | -0.5 | -50.0 |
| OTHERS | -0.5 | 100.0 | -0.5 | -50.0 |

FIG. 10
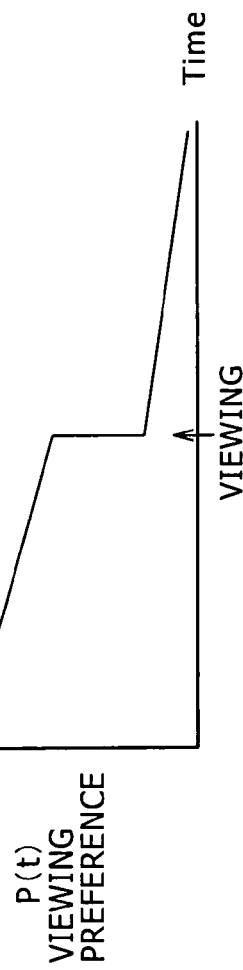
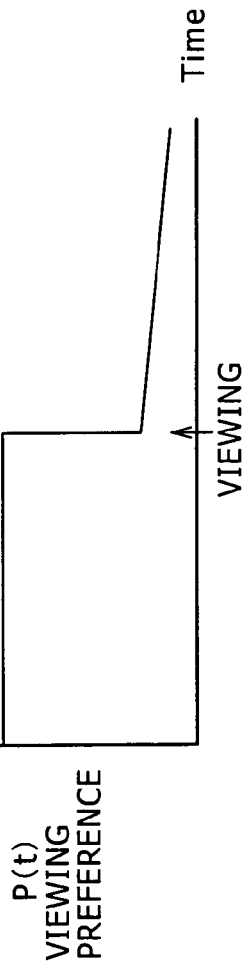

FIG. 12

| CONTENT A | MON-SUN, 19:00, GROUND ANALOG, CH1 | |
|---|---|---|
| START TIME, CHANNEL | MON-SUN, 19:00, GROUND ANALOG, CH1 | |
| KEYWORD | NEWS 7 | |
| BASIC PREFERENCE VALUE | +12.0 | 561 |
| WEEKLY TIME ZONE PREFERENCE VALUE | | |
| WEEKDAY 5:00-11:00 | +0.1 | |
| WEEKDAY 11:00-17:00 | +0.3 | |
| WEEKDAY 17:00-23:00 | +3.5 | |
| WEEKDAY 23:00- 5:00 | +3.2 | 562 |
| HOLIDAY 5:00-11:00 | +0.2 | |
| HOLIDAY 11:00-17:00 | +5.2 | |
| HOLIDAY 17:00-23:00 | +7.3 | |
| HOLIDAY 23:00- 5:00 | −0.5 | |

INFORMATION PROCESSING APPARATUS, INFORMATION PROCESSING METHOD, AND COMPUTER PROGRAM

CROSS REFERENCES TO RELATED APPLICATIONS

The present invention contains subject matter related to Japanese Patent Application JP 2004-177791 filed in the Japanese Patent Office on Jun. 16, 2004, the entire contents of which being incorporated herein by reference.

BACKGROUND OF THE INVENTION

The present invention relates to an information processing apparatus, an information processing method, and a computer program. More particularly, the present invention relates to an information processing apparatus, an information processing method, and a computer program that allow the presentation of programs (or content) on television broadcast receivers or storage-type television receivers in an optimum sequence in accordance with the date and time at which each user actually views the content and allows the user to efficiently extract desired content from among many pieces of content.

The content that is provided by television is viewed in two ways; viewing live broadcast being received on a television broadcast receiver and receiving television airwave at the receiver, storing the received content in data storage media such as hard disk drive or DVD, and selecting desired pieces of contents by the user from the stored data for viewing.

The recent rapid progress in communication infrastructure allows the user as a content viewer to receive and view huge amounts of content seldom seen in the past, such as satellite broadcasts transmitted via ground wave and satellite broadcasting like CS and BS as well as the Internet. However, the existence itself of such huge amounts of content presents problems of pushing up the load of content selection and channel selection for example for user.

In viewing live broadcasting with a television broadcast receiver, the user selects a desired channel and views the selected channel. This method is enough if there are only a small number of channels. However, as the number of channels increase, the number of operations that the user must perform for channel selection increases. The current situation where there are several tens to several hundred channels available makes it difficult for the user to quickly search for desired channels.

With television broadcast receivers in related art, once the user selects and sets a channel to be viewed, the receiver subsequently continues to display the selected channel until the user performs a new channel switching operation. Therefore, if the user wants to view another channel, it requires a troublesome operation of searching for the desired channel from among a huge amount of channels.

Further, in the case of viewing recorded content by use of a storage-type television apparatus having data storage means such as DVD or hard disk drive, it is a general practice for the user to display a recording list made up of program information such as broadcast program information (or EPG (Electronic Program Guide)) that is recorded by each storage-type television apparatus along with television programs, select desired recorded content from the display program list, and view the selected content.

This approach also requires the user to search for desired recorded content from a recording list for selection. Recent recording devices such as hard disk drive and DVD for example are capable of recording content for several hundred hours, thereby recording huge amounts of content on DVDs and other storage media. Consequently, like the above-mentioned channel selection, the user must perform again the processing of extracting desired content from a recorded content list having a great number of pieces of content. As the number of pieces of content increases, the user load also increases.

With these storage-type television broadcast receivers, it is also necessary for the user, in order to view another piece of content immediately after viewing the current one, to perform again the processing of searching for the desired piece of content and selecting the retrieved content. That is, the user must perform the selection of content from a list every time content reproduction is executed.

In order to solve the above-mentioned problems, a system has been proposed in which, when the reproduction of once piece of content ends, a list is set in the order of newer content, older content, content names, or unviewed content for example, thereby reproducing content one after the other in the specified order. However, this approach cannot always reproduce content in the order desired by the user because the order in which content is reproduced is based on simple rules.

Another method has been proposed in which received content or recorded content is controlled on the basis of user preference. For example, patent document 1 discloses a configuration in which program preference is computed on the basis of user's program viewing log data and content reception or content recording is controlled on the basis of the computed preference. Patent document 2 discloses a configuration of transmitting a list of broadcast-scheduled content from a server to various users in which the preference of each user is determined on the basis of the past program viewing status and recording status at each user terminal and a program list corresponding to the determined preference is provided.

The above-mentioned related-art techniques execute the processing by determining user preference in a uniform manner. However, user preferences change from time to time. For example, programs that the user wants to view on Sunday afternoon may often differ in kind from those to view weekday night. Many users want to view news programs on weekday evening but dramas on Saturday night and entertainments on Sunday afternoon, for example. Thus, the content that each user feels like viewing changes depending on days of the week and time zones, for example.

Related-art techniques propose a variety of configurations for executing channel control and recording control on the basis of user preference, but do not disclose any configurations that execute content control or list control by considering the timing of actual viewing by the user of content.

[Patent document 1]
Japanese Patent Laid-open No. 2003-23589
[Patent document 2]
Japanese Patent Laid-open No. 2003-114903

SUMMARY OF THE INVENTION

The present invention addresses the above-identified and other problems associated with related-art methods and apparatuses and, in order to circumvent these problems, provides an information processing apparatus and method and a computer program that, by taking the timing of actual content viewing by user into consideration, select the content that the user wants to view at that time, and present the selected content in the form of a list.

According to an embodiment of the present invention, there is provided an information processing apparatus including a preference information management block for computing content-by-content preference information, and a display information generation block for generating a list of content in sequence of preference on the basis of the content-by-content preference information computed by the preference information management block. The preference information management block computes a content-by-content preference value changing with time and the display information generation block generates a content list on the basis of a preference value changing with time computed by the preference information management block.

According to one embodiment of the information processing apparatus associated with the present invention, the above-mentioned preference information management block, in the computation of a content-by-content preference changing with time, executes preference computation processing applied with a function that is different before a content viewing time following a content recording time and after the content viewing time.

According to one embodiment of the information processing apparatus associated with the present invention, the above-mentioned preference information management block, in the computation of a content-by-content preference changing with time, defines a function applied with, a parameter that differs from one content type to another and executes preference computation processing applied with the defined function.

According to one embodiment of the information processing apparatus associated with the present invention, the above-mentioned preference information management block, in the computation of a content-by-content preference changing with time, executes the computation of a preference corresponding to a daily time zone.

According to one embodiment of the information processing apparatus associated with the present invention, the above-mentioned preference information management block, in the computation of a content-by-content preference changing with time, executes the computation of a preference that makes distinction between holiday and weekday.

According to one embodiment of the information processing apparatus associated with the present invention, the above-mentioned preference information management block, in the computation of a content-by-content preference changing with time, executes the computation of a preference that makes distinction between days of the week.

According to one embodiment of the information processing apparatus associated with the present invention, the above-mentioned preference information management block, in the computation of a content-by-content preference changing with time, executes the computation of a preference applied with a time-dependent parameter including a content-by-content basic preference value not changing with time and a day-of-the-week time zone preference value set in accordance with day of the week and time.

According to one embodiment of the information processing apparatus associated with the present invention, the above-mentioned preference information management block executes the processing of updating the day-of-the-week time zone preference value on the basis of a content viewing log of a viewer.

According to one embodiment of the information processing apparatus associated with the present invention, the above-mentioned preference information management block, in the processing of updating the day-of-the-week time zone preference value on the basis of a content viewing log of a viewer, executes the processing of updating within a range not exceeding a predetermined upper value.

According to an embodiment of the present invention, there is provided an information processing method including the steps of managing to compute content-by-content preference information; and generating display information for generating a list of content in sequence of preference on the basis of the content-by-content preference information computed by the preference information management step. The preference information management step computes a content-by-content preference value changing with time and the display information generation step generates a content list on the basis of a preference value changing with time computed by the preference information management step.

According to one embodiment of the information processing method associated with the present invention, the above-mentioned preference information management step, in the computation of a content-by-content preference changing with time, executes preference computation processing applied with a function that is different before a content viewing time following a content recording time and after the content viewing time.

According to one embodiment of the information processing method associated with the present invention, the above-mentioned preference information management step, in the computation of a content-by-content preference changing with time, defines a function applied with a parameter that differs from one content type to another and executes preference computation processing applied with the defined function.

According to one embodiment of the information processing method associated with the present invention, the above-mentioned preference information management step, in the computation of a content-by-content preference changing with time, executes the computation of a preference corresponding to a daily time zone.

According to one embodiment of the information processing method associated with the present invention, the above-mentioned preference information management step, in the computation of a content-by-content preference changing with time, executes the computation of a preference that makes distinction between holiday and weekday.

According to one embodiment of the information processing method associated with the present invention, the above-mentioned preference information management step, in the computation of a content-by-content preference changing with time, executes the computation of a preference that makes distinction between days of the week.

According to one embodiment of the information processing method associated with the present invention, the above-mentioned preference information management step, in the computation of a content-by-content preference changing with time, executes the computation of a preference applied with a time-dependent parameter including a content-by-content basic preference value not changing with time and a day-of-the-week time zone preference value set in accordance with day of the week and time.

According to one embodiment of the information processing method associated with the present invention, the above-mentioned preference information management step executes the processing of updating the day-of-the-week time zone preference value on the basis of a content viewing log of a viewer.

According to one embodiment of the information processing method associated with the present invention, the above-mentioned preference information management step, in the processing of updating the day-of-the-week time zone preference value on the basis of a content viewing log of a viewer, executes the processing of updating within a range not exceeding a predetermined upper value.

According to an embodiment of the present invention, there is provided a computer program for executing content list generation processing, including the steps of managing to compute content-by-content preference information, and generating display information for generating a list of content in sequence of preference on the basis of the content-by-content preference information computed by the preference information management step. The preference information management step computes a content-by-content preference value changing with time and the display information generation step generates a content list on the basis of a preference value changing with time computed by the preference information management step.

It should be noted that the computer program practiced as one embodiment of the present invention is a computer program that may be provided in recording media such as CD, FD, and MO or communication media such as network that provide, in a computer-readable form, computer programs to computer systems capable of executing various program codes, for example. Providing the above-mentioned computer program in any of the above-mentioned form allows the realization of the processing according to the program on computer systems.

Many other features, advantages, and additional objects of the present invention will become manifest to those versed in the art upon making reference to the following detailed description and the accompanying sheet of drawings. It should be noted that term "system" as used herein denotes an entire apparatus configured by a plurality of component units that are not always accommodated in one unit.

According to one configuration of the present invention, a preference value of each piece of content that changes with time is computed and a content list is generated on the basis of the computed preference value for presentation to the use, thereby allowing the presentation of a more timely content list to the user to realize the selection and viewing of content that properly reflect user preference.

Further, according to another configuration of the present invention, preference values are computed on the basis of daily time zone, holiday, weekday, and day-of-the-week and a list is generated on the basis of the computed preference values, thereby presenting the generated list to the user, thereby allowing the presentation of an optimum content list in accordance with the time zone and day-of-the-week on which the user views content to realize the selection and viewing of the content that properly reflects the preference of the user.

BRIEF DESCRIPTION OF THE DRAWINGS

FIG. 9 is a table illustrating an exemplary setting of parameters for use in the computation of preference to be applied to the determination of sequence of content lists to be presented to the user at the above-mentioned information processing apparatus;

FIG. 10 is a graph illustrating exemplary preference time transactions to be applied to the determination of sequence of content lists to be presented to the user at the above-mentioned information processing apparatus;

FIG. 12 is a table illustrating exemplary basic preference values and preference values by day-of-the-week time zone as preference constituent values to be applied to the determination of sequence of content lists to be presented to the user at the above-mentioned information processing apparatus.

DETAILED DESCRIPTION OF THE PREFERRED EMBODIMENTS

The following describes in detail an information processing apparatus, an information processing method, and a computer program according to embodiments of the present information with reference to accompanying drawings.

Figure 1:
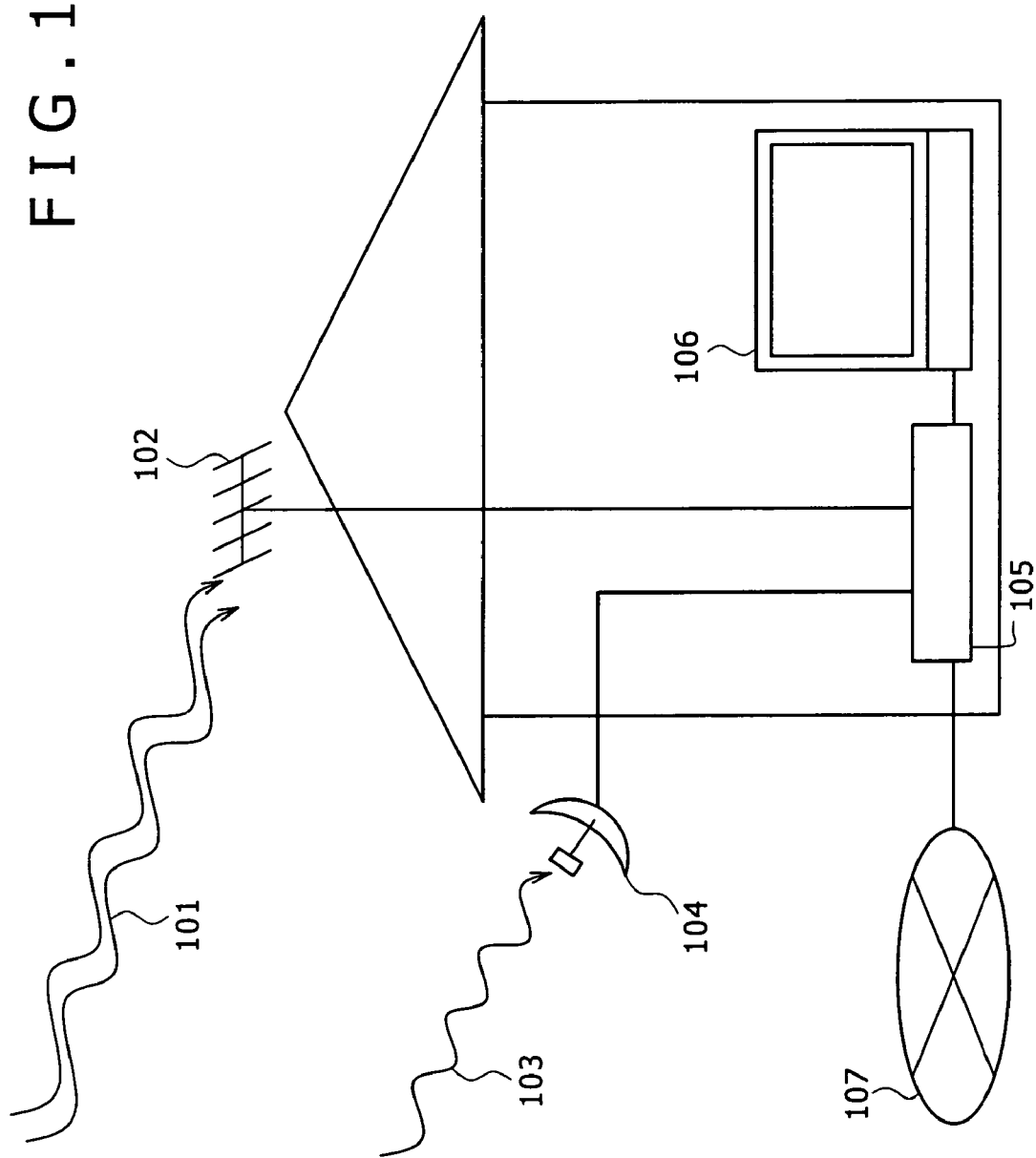
FIG. 1 is a schematic diagram illustrating a network system to which the present invention is applicable.

Now, referring to FIG. 1, an exemplary use configuration of the information processing practiced as one embodiment of the present invention will be described. The information processing apparatus 105, arranged in a user's home for example, receives, at an analog broadcast antenna 102, an analog broadcast signal carried by an analog airwave 101 and, at a digital broadcast antenna 104, a digital broadcast signal carried by an digital airwave 103, has tuner blocks for selectively inputting the received broadcast signals, and outputs the received broadcast signals to a display device 106 such as a television receiver or a display monitor for example, thereby reproducing received broadcast signals.

The information processing apparatus 105 has a data recording/reproduction control block to which a data recording medium such as DVD, hard disk drive, magnetic tape, removable disk, or flush memory for example is applied and is configured to record received broadcast signals to the data recording medium. In recording content to a recording medium for example, the information processing apparatus 105 executes data processing such as data compression and encryption for example and, in reproducing content, executes data decompression and decryption for example to process the recorded content, outputting the processed content to the display device 106.

The information processing apparatus 105 has a capability of obtaining EPG (Electronic Program Guide) information carried by the analog airwave 101 or the digital airwave 103. In addition, the information processing apparatus 105, connected with a network 107 such as the Internet for example, is capable of obtaining information about content or broadcast programs for example via the network.

Figure 2:
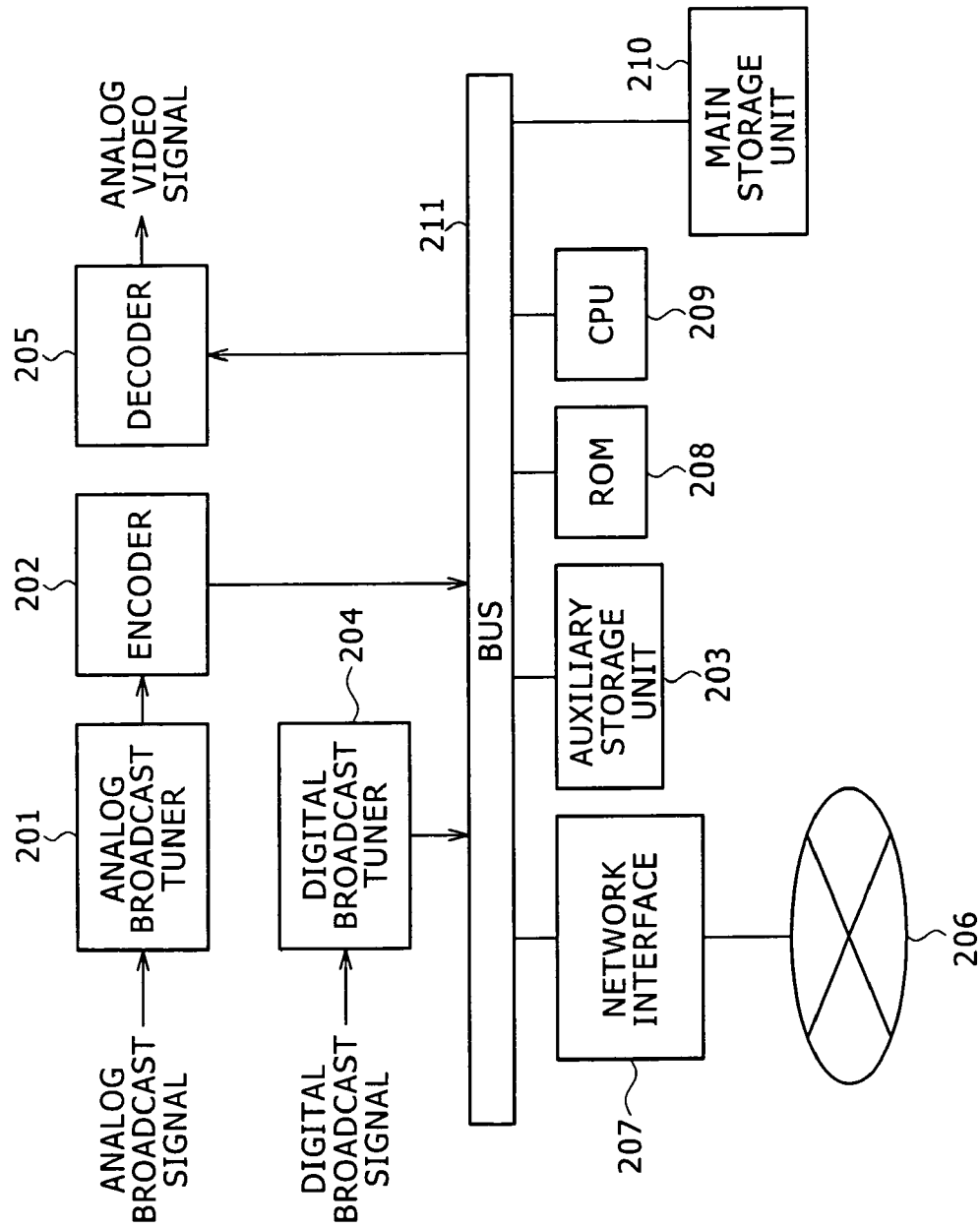
FIG. 2 is a block diagram illustrating an exemplary hardware configuration of an information processing apparatus according to an embodiment of the present invention.

The following describes a detail configuration of the information processing apparatus 105 with reference to FIG. 2. For the analog broadcast signal, a ground-wave television airwave received at the antenna is inputted through an analog broadcast tuner 201, a video signal component and an audio signal component thereof being outputted to an encoder 202. It should be noted that the vertical blanking interval of each ground-wave television airwave received at the antenna includes EPG information as broadcast program information and the analog broadcast tuner 201 also outputs this EPG information to the encoder 202.

The encoder 202 encodes an input signal transmitted from the analog broadcast tuner 201 by an encoding algorithm such as MPEG (Moving Picture Experts Group) for example and stores the input signal in an auxiliary storage unit 203 via a bus 211 as digital data. EPG information is stored at the same time. The auxiliary storage unit 203 is a storage device such as DVD, hard disk drive, magnetic tape, removable disk, or a flush memory, for example.

A digital airwave typically used in satellite broadcasting for example is inputted in a digital broadcast tuner 204 via a digital broadcast reception antenna and stored in the auxiliary storage unit 203 via the bus 211 as digital data. EPG information is also attached to each digital broadcast signal and stored in the auxiliary storage unit 203 at the same time.

In reproducing a signal stored in the auxiliary storage unit 203, the corresponding data is read from the auxiliary storage unit 203 to be outputted to a decoder 205 via the bus 211 to be decoded by MPEG for example, the decoded data being outputted to an output device such as a display monitor or a speaker for example. It should be noted that use of a tuner-encoder-decoder that is capable of simultaneously processing a plurality of video signals allows the simultaneous processing of the video signals of a plurality channels.

It should also be noted that, in the above-mentioned processing, a signal received at the tuner is once stored in the auxiliary storage unit before being reproduced; it is also practicable to directly output the signals inputted from the analog broadcast tuner 201 and the digital broadcast tuner 204 to the display device without storing in the auxiliary storage unit 203.

A network interface 207, connected to a network 206 such as the Internet for example, is capable of receiving various kinds of data such as program content, program information, or control information via the network 206.

Connected to the bus 211 are a main storage unit 210 based on RAM (Random Access Memory) and a ROM (Read Only Memory) 208, for example. The main storage unit 210 arbitrarily stores data and parameters necessary for a CPU (Central Processing Unit) 209 to execute various kinds of processing operations. The ROM 208 stores programs to be executed by the CPU 209. To be more specific, the ROM 208 stores software for controlling a video recording/reproducing apparatus according to one embodiment of the present invention that will be described below. This software is read from the ROM 208 when the video recording/reproducing apparatus starts operating. Various kinds of data processing and control operations are executed by the CPU 209 that functions as a control block by transferring data with devices connected to the bus 211 by use of the main storage unit 210 as a work area and a parameter storage area.

It should be noted that the auxiliary storage unit 203 stores not only content and EPG information but also user content preference information for use in arranging content to be viewed and automatic timer recording, various kinds of control information, and programs for executing the processing to be described below. Although not shown in FIG. 2, the information processing apparatus has a clock and a timer for date and time management that are used for timer-recording processing and the computation of date-dependent content preference to be described later. The clock capable of date and time management has a calendar capability having the information for managing weekdays, holidays, and day of the week.

Figure 3:
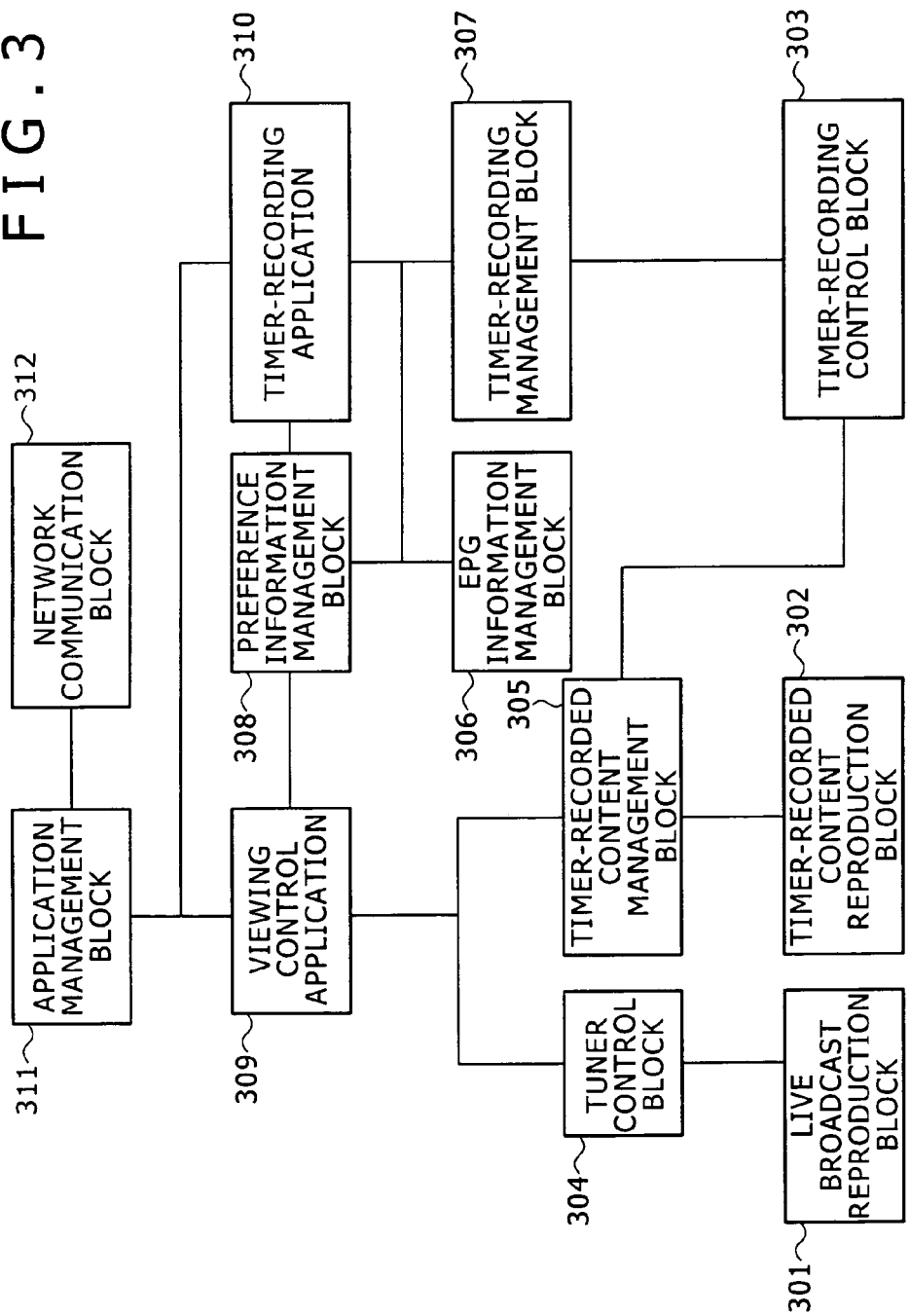
FIG. 3 is a block diagram illustrating an exemplary functional configuration of the above-mentioned information processing apparatus.

The following describes the processing capabilities of the information processing apparatus for executing broadcast signal reception, storage, and reproduction processing by use of programs that are executed by the CPU 209 functioning as the controller block, with reference to FIG. 3.

[Basic Capability of Content Reproduction]

A live broadcast reproduction block 301 executes the reproduction processing based on a signal received through a tuner. A recorded content reproduction block 302 executes the processing of reproducing recorded content (a cluster of audio/video data recorded on a program basis and data accompanying thereto). A video recording control block 303 executes recording control for recording broadcast video and externally inputted video. A tuner control block 304 executes receiver channel switching control.

[Information Management Capability]

A recorded content management block 305 executes the processing of holding and managing information about recorded content. An EPG information management block 306 executes the management of EPG information. A timer-recording management block 307 executes the management of timer-recording information. The timer-recording management block 307 executes the management of timer-recording information on the basis of instructions given by a timer-recording application 310. A preference information management block 308 computes preference of each piece of content. The computed preference information is used for content list presentation or automatic timer-recording. Preference information is obtained on the basis of the viewing or recorded content information and the broadcast program information under the control of a viewing control application 309. The viewing or recorded content information is obtained from the tuner control block 304 and the recorded content management block 305. The broadcast program information is obtained from the EPG information management block 306. The preference computation processing in the preference information management block 308 is executed as the computation of time-dependent preference, for example. To be more specific, the preference information management block 308 executes preference computation processing by applying a function that is different between the time from content recording to content viewing and the time after content viewing and preference computation processing by making distinction between daily time zones and between holiday, weekday, and day of the week. Details of these processing operations will be described later.

[Other Capabilities]

The viewing control application 309 provides a capability of user interface and executes live broadcast and recorded content reproduction control on the basis of user instructions. Further, as described above, the viewing control application 309 supplies the viewing or recorded content information obtained from the tuner control block 304 and the recorded content management block 305 to the preference information management block 308. Also, on the basis of the preference of each piece of content computed by the preference information management block 308, the viewing control application 309 has a capability of a display information generator block that generates a content list having content in the order of preference and outputs the generated content list to a display block for the presentation to the user.

The timer-recording application 310 executes timer recording. The information necessary for timer recording includes the user instruction information inputted through the viewing control application 309 and the user preference information inputted through the preference information management block 308.

An application management block 311 manages the operations of the entire application as required. Also, the application management block 311 has a network communication block 312 that provides software for network connection.

The components that play a central role of the present invention to be described below include the preference information management block 308 and the viewing control application 309. The preference information management block 308 is executed as the processing of computing time-dependent preference. To be more specific, as described above, the preference information management block 308 executes preference computation processing by applying a function that is different between the time from content recording to content viewing and the time after content viewing and preference computation processing by making distinction between daily time zones and between holiday, weekday, and day of the week.

The viewing control application 309 closely communicates with the preference information management block 308 and the application management block 311 to generate a content list in accordance with the time-dependent preference computed by the preference information management block 308 and outputs the generated content list to the display block for presentation to the user. The content list is a list in which the pieces of content to be viewed are set in a certain sequence. In addition, the viewing control application 309 executes the processing of obtaining device status information, channel information in the viewing mode for example, and content information in the recording mode. The following describes specific contents of a content list that is applied to the viewing of live broadcast and recorded content.

Figure 4:
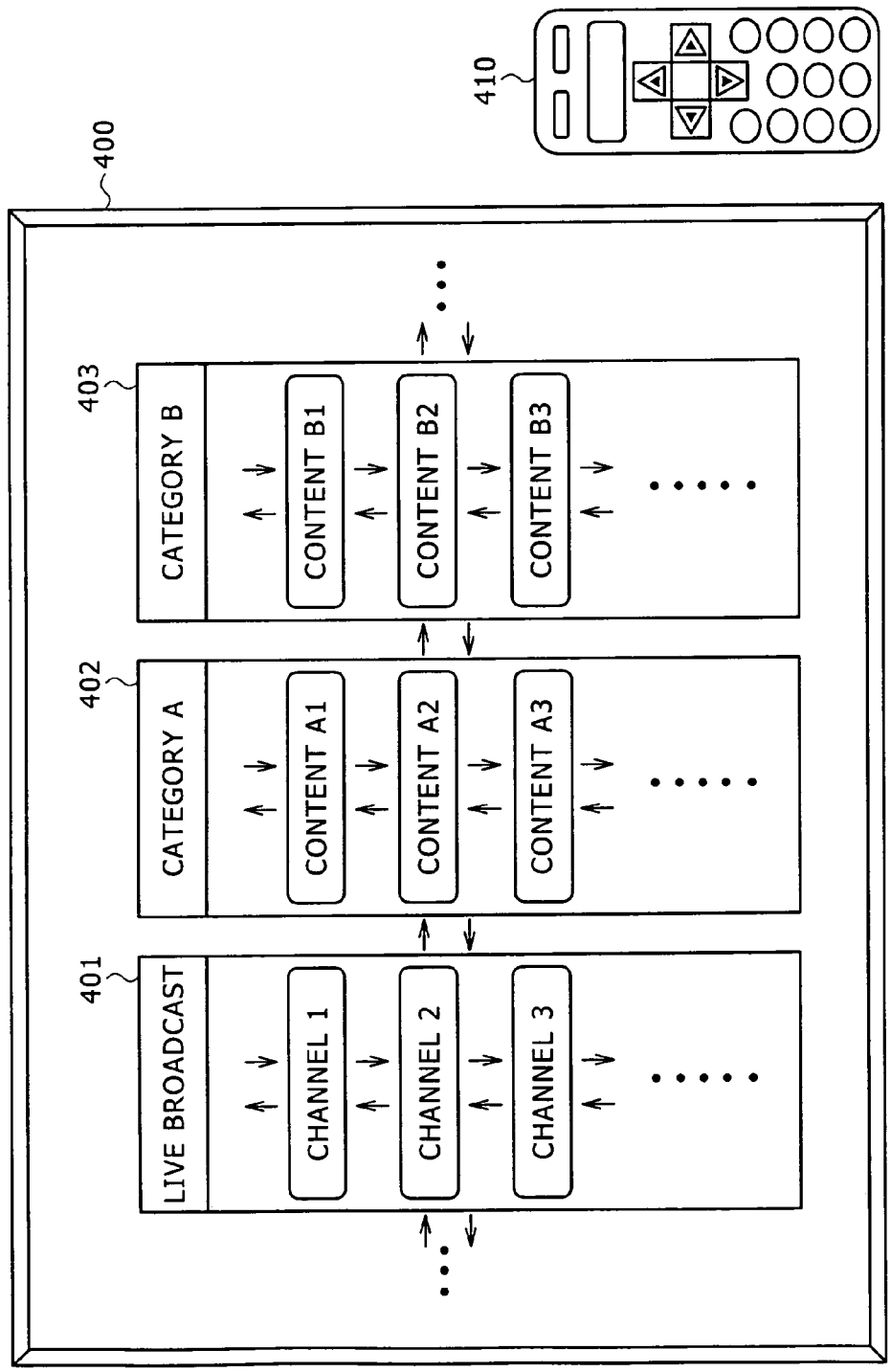
FIG. 4 is a schematic diagram illustrating an exemplary content information display to be presented to a user of the above-mentioned information processing apparatus at this information processing apparatus.

Referring to FIG. 4, there is shown an exemplary content list that is displayed on a display device 400 that is a user interface. The content list is applicable as a content select screen by the user. The display device 400 shows content selectable by category. Display data 401 lists content selectable as a first category about live broadcast and presents a list of viewable channel numbers. The setting of a list sequence will be described later.

Display data 402 and display data 403 are recorded content for example and classified as information by genre. These data are set as content information lists including titles of recorded content in each category.

Each category represents content genre and content broadcast sources (ground-wave analog, ground-wave digital, BS digital, etc.) for example. The user is able to switch between categories by operating "left" and "right" buttons arranged on remote commander 410. In each category, pieces of content belonging to that category are arranged and displayed. The user is able to switch between recorded pieces of content by operating "up" and "down" buttons or a channel switch button on the remote commander 410.

The user interface shows a plurality of categories and pieces of content in the form of a list. The user is able to select any piece of content shown in the list by operating the remote commander 410, reproducing the selected piece of content. In addition, when a particular piece of content is being reproduced, the user is also able to switch between categories or pieces of content to be reproduced by operating "up", "down", "left", and "right" buttons of the remote commander. Further, when the reproduction of one piece of content in a certain category has ended, a next piece of content in the category is automatically reproduced sequentially from the top of the list. In each content list of each category, pieces of content are arranged in the sequence of reproduction. However, the user is also able to change this sequence by operating "up", "down", "left", and "right" buttons of the remote commander 410 to selected desired pieces of content in random manner.

One important aspect of the present invention is the setting of the display sequence of content in each content list arranged in each category and displayed through a user interface and the updating of this setting.

Figure 5:
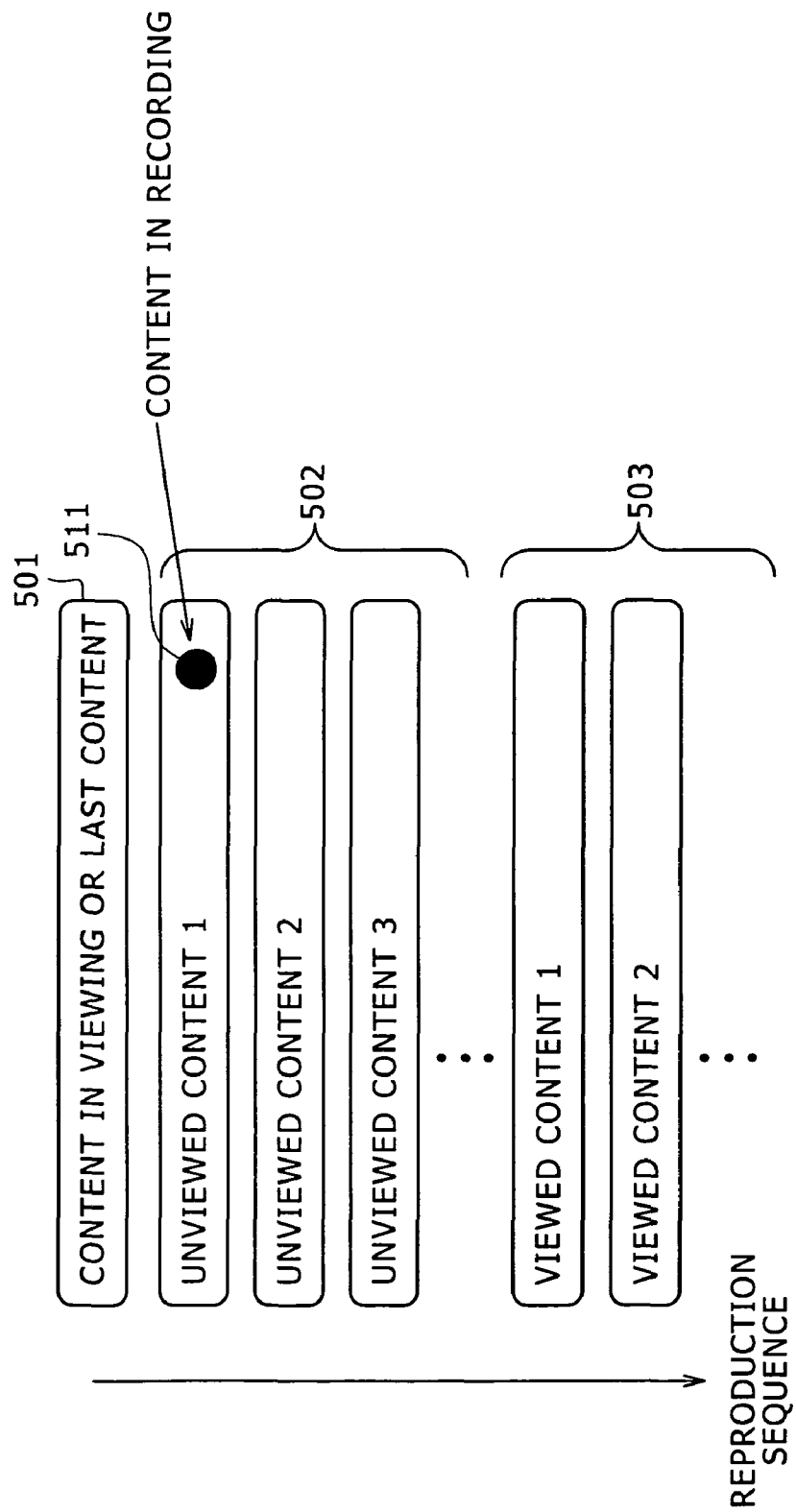
FIG. 5 is a schematic diagram illustrating an exemplary content list to be presented to the user at the above-mentioned information processing apparatus.

Referring to FIG. 5, there is shown a first example of content arrangement in a category. The figure shows an exemplary display of content lists in one category. This example is configured to list content information in a sequence of:
(1) content-in-viewing or last content;
(2) content group not yet viewed; and
(3) content group already viewed.

Upon turning on the power to the information processing apparatus, the reproduction starts with the content viewed last at the last discontinued point thereof. When the user selects a particular piece of content, the reproduction thereof starts. When the reproduction of content starts, content information 501 corresponding to the currently viewed content is arranged at the top of the category as shown in FIG. 5. Subsequently downward, a unviewed content group 502 is arranged and a viewed content group 503 is arranged at the bottom of the category.

When the reproduction of currently viewed content ends, the reproduction of the following content starts unless the reproduction of another piece of content is specified by the user through the remote commander. It should be noted that, with the unviewed content group 502 and the viewed content group 503, the pieces of content included herein may be arranged in the order of later or earlier recording start time or in the order of titles. Also, each of these content groups may include pieces of content being current recorded or being currently broadcast but not recorded. In the example shown in FIG. 5, the unviewed content group 502 is an example in which pieces of content are arranged in the order of later recording start time, the content information corresponding to the currently recorded content being presented at the top of this content group. A in-recording identification marker 511 indicates that a particular piece of unviewed content in the list is currently recorded.

The content list arrangement configuration shown in FIG. 5 allows the user (or the viewer) to view any unviewed content with priority after the end of the reproduction of the content currently being viewed. Also, only pressing "down" button of the remote commander allows viewing of another unviewed piece of content. When the viewing of a particular piece of content starts, that particular piece of content is rearranged at the top as "in viewing". If a new piece of recorded content occurs, list update processing for adding content information to the unviewed content group 502 is executed.

Figure 6:
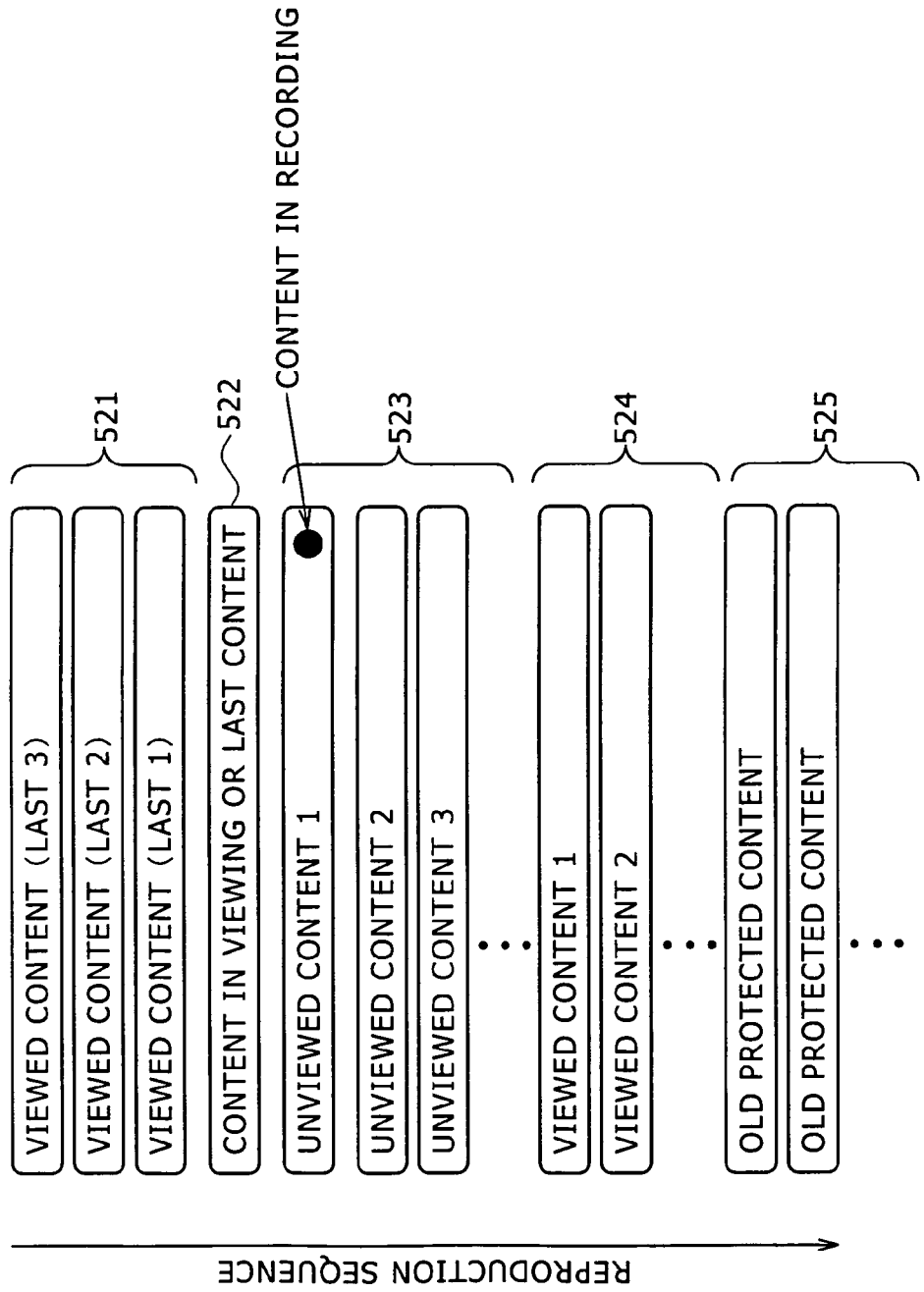
FIG. 6 is a schematic diagram illustrating another exemplary content list to be presented to the user at the above-mentioned information processing apparatus.

Referring to FIG. 6, there is shown a second example of category content arrangement. The example shown in FIG. 6 is configured to list content information in a sequence of:
(1) nearest viewed content group;
(2) content-in-viewing or last content;
(3) content group not yet viewed;
(4) content group already viewed (unprotected); and
(5) content group already viewed (protected).

Unlike the arrangement of the first example (refer to FIG. 5), the second example shown in FIG. 6 arranges a nearest viewed content group 521 on top of the currently viewed content, rather than arranging the currently viewed content at the top. Content information 522 corresponding to the currently viewed content is set thereunder. Further, the content information about each of an unviewed content group 523, a viewed content group (unprotected) 524, and a viewed content group (protected) is listed.

In the list of content information in the nearest viewed content group 521, the piece of content of which viewing timing is later comes to the bottom (last 1) and the piece of content of which viewing timing is earlier (in the past) comes top (last 3). It is also practicable to make other settings such as the setting in the sequence of earlier or later or the setting in the sequence of names, for example.

The other list setting sequences in each content group may be the sequence of earlier or later or the sequence of names as with the first example. This arrangement configuration allows the user to view recently viewed pieces of content again only by pressing "up" button of the remote commander. This nearest viewed content group may also include content-in-viewing and content currently being broadcast although not recorded.

Figure 7:
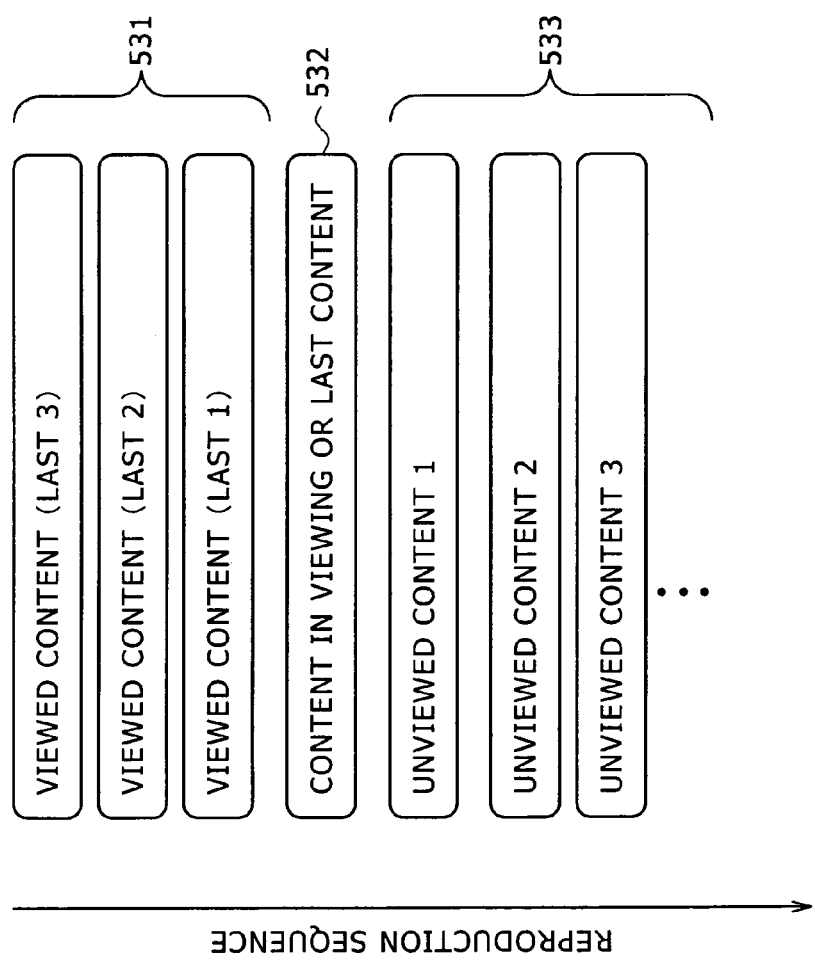
FIG. 7 is a schematic diagram illustrating still another exemplary content list to be presented to the user at the above-mentioned information processing apparatus.

Referring to FIG. 7, there is shown a third example of category content arrangement configuration. The example shown in FIG. 7 is configured to list content information in a sequence of:
(1) nearest viewed content group;
(2) content-in-viewing or last content; and
(3) content group in the sequence of time-dependent preference.

With this third example, the content currently being viewed or the content arranged higher than this content may be configured for the same arrangement as shown in either in the first example (refer to FIG. 5) or the second example (refer to FIG. 6). In the example shown in FIG. 7, nearest viewed content 531 is followed below by content-in-viewing 532.

Below content-in-viewing 532, a time-dependent preference sequence content group 533 is arranged. With the time-dependent preference sequence content 533, the sequence in list of the content information to be arranged is changed on the basis of the date and time at which the user views or user preference.

Figure 8:
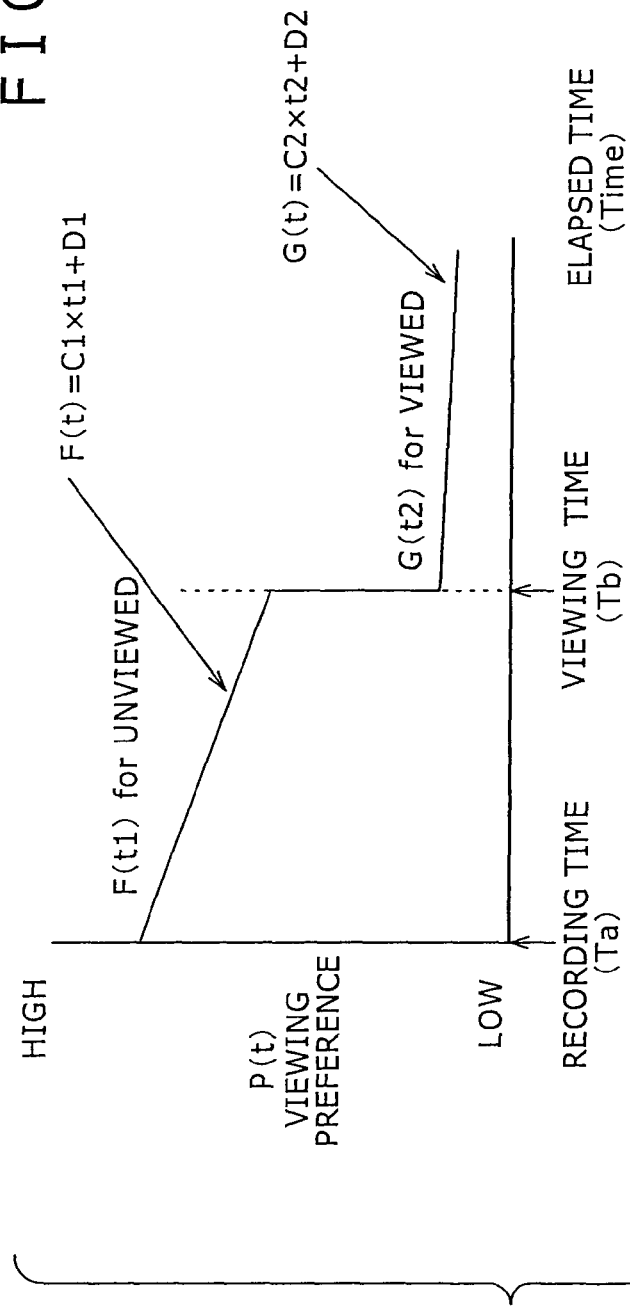
FIG. 8 is a graph illustrating an exemplary preference computation to be applied to the determination of sequence of content lists to be presented to the user at the above-mentioned information processing apparatus.

The following describes a list sequence setting and updating method. Referring to FIG. 8, there is shown a graph indicative of a time-dependent change in user (or viewer) preference of content.

The above-mentioned graph indicates the transition in the content preference of the user (or the viewer) along the time starting from the recording (Ta) of a particular piece of content. The preference is indicated by function P(t) with respect to time (t) as follows, which is different before and after the viewing of content.

Before Content Viewing:
preference Pt=F(t1), where t1 stands for an elapsed time from recording time (Ta).
After Content Viewing:
preference Pt=G(t2), where t2 stands for an elapsed time from viewing time (Tb).
Function F(t1) and function G(t2) may be expressed in a linear function as follows for example:

$$F(t1)=C1 \times t1+D1 \text{ and}$$

$$G(t2)=C2 \times t2+D2,$$

where C1, D1, C2, and D2 are predetermined constants. These functions are illustrative only; various other functions with which the preference lowers as time passes are also applicable.

The preference is high before content viewing and gradually lowers with function F(t1) and quickly lowers when viewing is executed, continuing still lowering with time.

In setting the list of content included in the time-dependent preference sequence content 533 shown in FIG. 7, the preferences corresponding to a plurality of pieces of content included in the time-dependent preference sequence content 533 are computed and the computed pieces of content are set in the order of higher preferences. The computation of this preference information is executed by the preference information management block 308 shown in FIG. 3. To be more specific, the preference information management block 308 inputs the viewing information and recording information of content to be inputted from the viewing control application 309, computes the elapsed time of recording time and viewing time on the basis of the clock and the timer incorporated in the information processing apparatus, and computes the preference of each piece of content at certain intervals. The viewing control application 309 that functions as a display information generator block generates a content list based on a preference value changing with the elapsed time computed by the preference information management block 308 and outputs the generated list to the display monitor.

It should be noted that the preference information management block 308 determines whether a particular piece of content has already been viewed, namely whether a particular piece of content has been viewed more than half of the length thereof, on the basis of the content viewing information and recording information inputted from the viewing control application 309.

In the configuration where preference computation processing is executed by applying a function that is different between the time from content recording to viewing and the time after content viewing, parameters C1, D1, C2, and D2 in linear function expressions shown below for example may be predetermined constants:

$$\text{preference before content viewing } Pt=F(t1)=C1 \times t1+ D1;$$

$$\text{preference after content viewing } Pt=G(t2)=C2 \times t2+ D2.$$

Alternatively, parameters that are different with content genres may be applied as shown in FIG. 9 for example.

It is important for news and sport programs for example to be new; therefore, with time, these kinds of programs is getting lower in worthiness, thereby quickly lowering the preference regardless whether the viewing has been made or not. On the other hand, the preference of the content such as drama and movie of which newness is not so important lowers little in worthiness with time; rather, this preference largely depends only on whether the viewing has been made or not.

The following describes a specific preference lowering transition with reference to FIG. 10. (a) in FIG. 10 shows a time transition of the preference for the content such as news and sports. Freshness is important for these pieces of content, so that their preferences quickly lower with time. Regardless whether or not these pieces of content have been viewed, the preference lowers quickly. (b) in FIG. 10 shows a time transition of the preference for drama, movie, and cartoon. For these pieces of content, newness is not so important, so that the preference with time does not lower much but lowers quickly once viewed.

As described above, the time transition of preference often depends on content. Therefore, providing a configuration in which different parameters are applied for different content genres as shown in FIG. 9 allows the computation of proper preference in accordance with each piece of content.

The above-mentioned preference is computed in accordance with each piece of content and the content information corresponding to the content of high preference is listed on top of the time-dependent preference sequence content 533 shown in FIG. 7, displaying the listed content preference. This configuration allows the user to preferentially select the content having high preference and view the selected content. It should be noted that the parameters shown in FIG. 9 may be configured so as to change parameter values by the user as required or automatically change them through learning capabilities based on various user operations on content, such as timer-recording of content, write-protect operation on content, cancellation of content timer-recording, and keyword registration for content search, for example.

Figure 11:
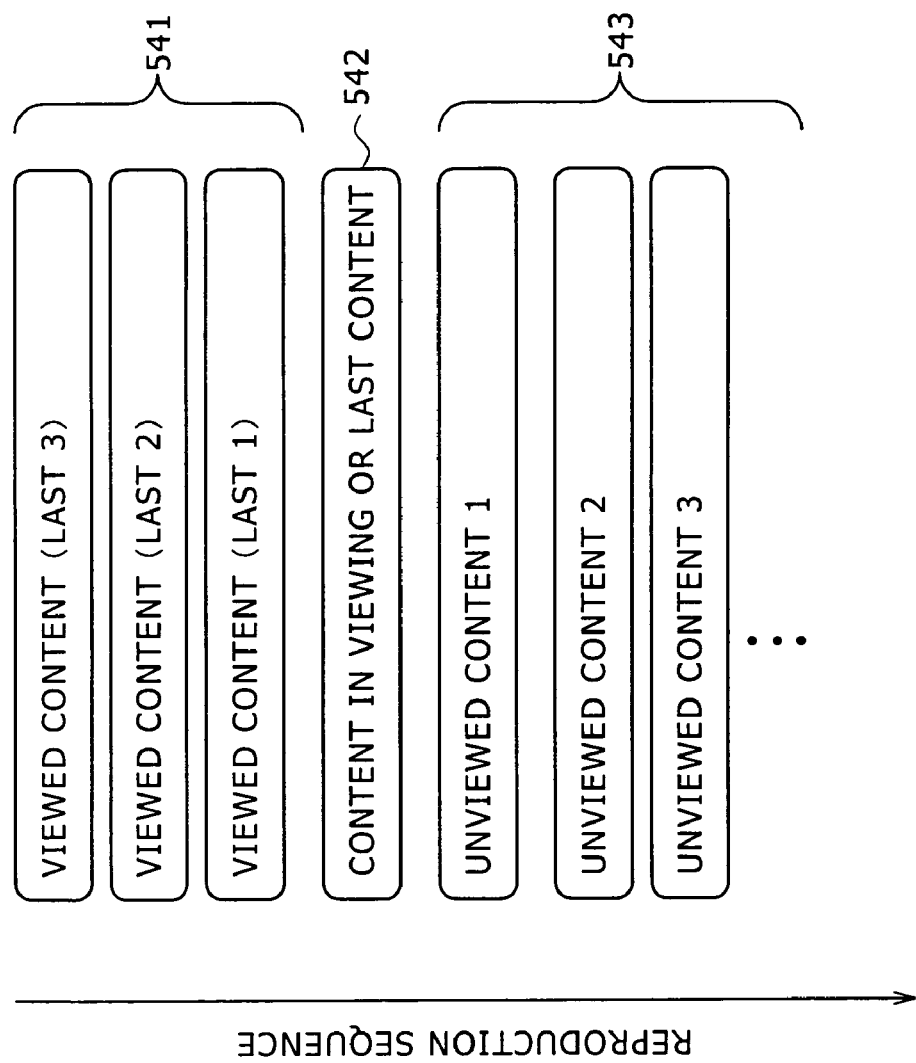
FIG. 11 is a schematic diagram illustrating an exemplary content list to be presented to the user at the above-mentioned information processing apparatus.

The following describes a fourth example in which preference is computed by considering a date and time at which the user actually views a particular piece of content and the content information is listed in the order of higher preference. FIG. 11 shows the fourth example. This example is configured to list the content information in the following sequence:
(1) nearest viewed content group;
(2) content-in-viewing or last content; and
(3) user viewing date dependent preference sequence content.

With the fourth example, the content currently being viewed or the content arranged higher than that may have substantially the same configuration in the arrangement methods shown in the first example (FIG. 5) and the second example (FIG. 6). In the example shown in FIG. 11, a nearest viewed content group 541 is followed down by content-in-viewing 542.

Below content-in-viewing 542, a user viewing date dependent preference sequence content group 543 is arranged. With the user viewing date dependent preference sequence content group 543, the list sequence of the content information to be arranged is changed on the basis of the preference presented on the basis of the date and time at which the content is actually viewed by the user.

Like the above-mentioned third configuration example, the fourth example basically computes the preference corresponding to content. With the third example, it is basic that the preference of each piece of content lowers with time. With the fourth example, the preferences goes up and down with date and time. For example, the genres of programs that the user wants to view in Sunday afternoon and weekday night are often different. For example, news programs are preferentially viewed at weekday night, while dramas are preferentially viewed at Saturday night and entertainment programs at Sunday afternoon; thus, the content that the user wants to view depends on days of the week and time zones.

Therefore, if the current time is weekday night for example, the preference for news programs is computed high and the preference for entertainment programs is computed low, thereby presenting the content information corresponding to news programs over the user viewing date dependent preference sequence content group 543 shown in FIG. 11. If the current time is Sunday afternoon for example, the preference for entertainment programs is computed high and the preference for news programs is computed low, thereby presenting the content information corresponding to entertainment programs over the user viewing date dependent preference sequence content group 543 shown in FIG. 11.

Shown below are equations for computing current time dependent preference.

In this example, the transition in preference for content of the user that changes with time starting with recording time (Ta) of a certain piece of content is also expressed in function P(t) of time (t), the following equations being applied before and after content viewing.

Before Content Viewing:
preference $Pt=F(t1)+C1\times Pref$ (Content, day, time), where t1 indicates elapsed time from recording time (Ta) and C1 indicates a coefficient.

After Content Viewing:
preference $Pt=G(t2)+C2\times Pref$ (Content, day, time), where t2 indicates elapsed time from viewing time (Tb) and C2 indicates a coefficient.

In each of the above-mentioned equations, Pref (Content, day, time) are time-dependent parameters. Time dependent parameters Pref (Content, day, time) is further expressed in the following equation.

Pref (Content, day, time)=basic preference value+day-of-the-week time zone preference value, where the basis preference value and the day-of-the-week time zone preference value are defined as follows.

<Basic Preference Value>

Unless updated, the basic preference value is one that is specified for time-independent content. For this basic preference value, a value predetermined in accordance with the type of content may be used or a value that is set on the basis of a user operation on content may be used. For example, the basic preference value may be determined on the basis of various user operations corresponding to content, such as content timer-recording operation, content write-protect operation, content timer-recording cancel operation, and a keyword registration operation for content search. An exemplary preference value determination processing based on user operation may be that of a configuration disclosed in Japanese Patent Laid-open No. 2004-72502 file as a previous patent application by the applicant hereof, for example.

<Day-of-the-Week Time Zone Preference Value>

A day-of-the-week time zone preference value is set for each piece of content by day-of-the-week and time zone. FIG. 12 shows an example of a basic preference value 561 and a day-of-the-week time zone preference value 562. To be more specific, the basic preference value 561 and the day-of-the-week time zone preference time 562 of a news program of which broadcast time (or recording time) is 19:00, Monday through Sunday.

Basic preference value=+12 denotes a preference value corresponding to content and is not variable with time zone.

On the other hand, the day-of-the-week time zone preference value is set as a different value for different day-of-the-week and time zone as shown below:

weekday 5:00-11:00=+0.1
weekday 11:00-17:00=+0.3
weekday 17:00-23:00=+3.5
weekday 23:00-5:00=+3.2
holiday 5:00-11:00=+0.2
holiday 11:00-17:00=+5.2
holiday 17:00-23:00=+7.3
holiday 23:00-5:00=−0.5

In the above-mentioned example, "holiday 17:00-23:00=+7.3" is the highest day-of-the-week time zone preference value and "holiday 23:00-5:00=−0.5" is the lowest day-of-the-week time zone preference value. The day-of-the-week time zone preference value is set in accordance with content. In the example shown in FIG. 11, only weekday and holiday are used and time zones are classified on a 6-hour basis. This is illustrative only. For example, the classification may be made on the basis of each day-of-the-week and on a 4-hour, 3-hour, 1-hour basis.

For relating each piece of content with time-dependent parameter Pref (Content, day, time), corresponding time-dependent parameter Pref (Content, day, time) is selected on the basis of content identification information on the basis of a combination of program start time data and channel data. Alternatively, the corresponding time-dependent parameter Pref (Content, day, time) is selected by determining a program or a program genre on the basis of a keyword obtained from the program information (EPG) corresponding to content. Still alternatively, the time-dependent parameter Pref (Content, day, time) corresponding to each piece of content may be selected by applying a rougher classification of genre (drama, variety, and sport). This processing is executed by the preference information management block 308 shown in FIG. 3.

As seen from the above description, in this example, the computation of the preference corresponding to content is executed by equations below.

Before Content Viewing:
preference Pt=F(t1)+C1×Pref (Content, day, time)=F(t1)+ C1×(basic preference value+day-of-the-week time zone preference value), where t1 stands for an elapsed time from recording time (Ta) and C1 stands for a coefficient.

After Content Viewing:
preference Pt=G(t2)+C2×Pref (Content, day, time)=G (t2)+C2×(basic preference value+day-of-the week time zone preference value), where t1 stands for an elapsed time from viewing time (Tb) and C2 stands for a coefficient.

In the above-mentioned equations, F(t1) and G(t2) may be expressed in linear functions as shown below as described with reference to FIGS. 8 through 10A and 10B:

$$F(t1)=C1 \times t1+D1$$

$$G(t2)=C2 \times t2+D2$$

Parameters C1, D1, C2, and D2 may be predetermined constants. Alternatively, these parameters may be different for different genres of content as shown in FIG. 9.

The preference information management block 308 obtains current date information from the timer in the information processing apparatus and computes the preference value of each piece of content every 6 hours if the day-of-the-week tine zone preference value is changed every 6 hours as shown in FIG. 11 in which

5:00-11:00
11:00-17:00
17:00-23:00
23:00-5:00

On the basis of the computed content preference values, a data update operation is executed to display the content information corresponding to a piece of content having a higher preference value to a higher position in the list of the user viewing date dependent preference sequence content group shown in FIG. 11. This configuration allows the user to selectively view content of higher preference in accordance with the current date and time, such as weekday night or holiday noon.

It should be noted that the day-of-the-week time zone preference value may be a fixed value that corresponds to each piece of content; alternatively, the day-of-the-week time zone preference value may be subject to update on the basis of a user viewing log for content. Every time a piece of content has been viewed, a point is added to the viewed day-of-the-week time zone preference value. An upper limit value is set to each day-of-the-week time zone preference value. If this upper limit value is exceeded, all day-of-the-week time zone preference values of that content are multiplied by a certain value to bring the maximum value inside the upper limit value (thereby standardizing the day-of-the-week time zone preference values).

Each day-of-the-week time zone preference value is updated by use of the following equation:
day-of-the-week time zone preference value (new)=day-of-the-week time zone preference value (old)+p.

Let p=0.1, then in the example shown in FIG. 11, if the user views this piece of content (news) in time zone 11:00-17:00, holiday, the current day-of-the-week time zone preference value=7.3 is set as
day-of-the-week time zone preference value (new)=7.3+ 0.1=7.4. Further, if the user views this piece of content (news) in time zone 11:00-17:00, holiday, next week, then,
day-of-the-week time zone preference value (new)=7.4+ 0.1=7.5, subsequently increasing from 7.6 to 7.7 to 7.8 to 7.9 to 8.0 to 8.1 to 8.2.

However, a upper limit value is set to each day-of-the-week time zone preference value. If the upper limit value is 8.0 for example, and if any of the day-of-the-week time zone preference values of this piece of content exceeds 8.0, then all day-of-the-week time zone preference values of this piece of content are multiplied by a certain value to bring the maximum value within the upper limit value (thereby standardizing the day-of-the-week time zone preference values). All the day-of-the-week time zone preference values of this piece of content are updated by use of:

day-of-the-week time zone preference value (new)
=day-of-the-week time zone preference value
(old)×(upper limit value/maximum value).

This processing of updating day-of-the-week time zone preference value arbitrarily update the day-of-the-week time zone preference values by reflecting the user's viewing status within a range of the upper limit value.

While preferred embodiments of the present invention have been described using specific terms, such description is for illustrative purpose only, and it is to be understood that changes and variations may be made without departing from the spirit or scope of the following claims.

The above-mentioned sequence of processing operations may be executed by software, hardware, or the combination thereof. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

For example, the program may be stored, in advance, in a hard disk drive or a ROM (Read Only Memory) that provides a recording medium. Alternatively, the program may be temporarily or permanently stored (or recorded) in a removable recording medium such as flexible disk, CD-ROM (Compact Disc Read Only Memory), MO (Magneto-optical) disk, DVD (Digital Versatile Disc), magnetic disk, or semiconductor memory. These removable recording media may be provided as so-called package software.

It should be noted that the program may be not only installed on the computer from the above-mentioned removable recording media, but also installed on the computer in a wireless manner from a download site or a wired manner via a network like LAN (Local Area Network) or the Internet, the program thus received by the computer being stored in the built-in recording medium such as a hard disk drive.

It should also be noted that various processing operations described herein may be not only sequentially executed in a time-dependent manner but also executed concurrently or discretely. Term "system" as used herein denotes an entire apparatus configured by a plurality of component units.

As described and according to embodiments of the present invention, in the preference computation processing, the preference values of corresponding to content that change with time are computed and a content list is generated on the basis of the computed preference values, thereby presenting the generated content list. This novel configuration allows the presentation of a timely content list to the user, thereby realizing the selection and viewing of the content that properly reflects the preference of the user.

In addition, according to embodiments of the present invention, preference values are computed on the basis of daily time zone, holiday, weekday, and day-of-the-week and a list is generated on the basis of the computed preference values, thereby presenting the generated list to the user. This novel configuration allows the presentation of an optimum content list in accordance with the time zone and day-of-the-week on which the user views content, thereby realizing the selection and viewing of the content that properly reflects the preference of the user.

What is claimed is:

1. An information processing apparatus comprising:
a processor;
a timer unit configured to count a time;
a storage unit configured to store a plurality of content;
a preference information management block configured to compute, with the processor, a preference value indicating a user preference of a specific content of the plurality of content, by using a first function that continuously decreases the preference value of the specific content as the time counted by the timer unit increases, wherein a first rate of decrease of the preference value provided by the first function is based on a genre of the specific content, when the specific content has not been reproduced, and by using a second function that continuously decreases the preference value assigned to the specific content as the time counted by the timer unit increases, wherein a second rate of decrease of the preference value provided by the second function is based on the genre of the specific content, when the specific content has been reproduced, and the first rate of decrease of the preference value provided by the first function is different from the second rate of decrease of the preference value provided by the second function; and
a display information generation block configured to generate, with the processor, a list of the plurality of content that is stored on the storage unit, the list ordering the specific content among the plurality of content according to a magnitude of the preference value of the specific content computed by said preference information management block.

2. The information processing apparatus according to claim 1, wherein said computing of the preference value uses the first function $F(t)=C1 \times t+D1$, where F is the preference value as a function of time, C1 is a predetermined constant that indicates a slope of a decrease of the preference value, and D1 is the preference value at a time instant when the specific content is recorded to the storage unit.

3. The information processing apparatus according to claim 1, wherein the decrease of the preference value is faster for sports content than for movie content.

4. The information processing apparatus according to claim 1, wherein the decrease of the preference value is faster for news content than for movie content.

5. The information processing apparatus according to claim 1, wherein the decrease of the preference value is different depending on at least one of a time zone of a user, whether it is a holiday or a week day, or a day of the week.

6. The information processing apparatus according to claim 1, wherein after the time instant the specific content has been viewed, the preference value is set to a lower value in a step, and is thereafter decreased less fast than before the viewing according to the second function.

7. An information processing method comprising:
counting a time with a timer unit;
storing a plurality of content in a storage unit;
computing, with a processor, a preference value indicating a user preference of a specific content of the plurality of content, by using a first function that continuously decreases the preference value of the specific content as the time counted by the timer unit increases, wherein a first rate of decrease of the preference value provided by the first function is based on a genre of the specific content, when the specific content has not been reproduced, and by using a second function that continuously decreases the preference value assigned to the specific content as the time counted by the timer unit increases, wherein a second rate of decrease of the preference value provided by the second function is based on the genre of the specific content, when the specific content has been reproduced, and the first rate of decrease of the preference value provided by the first function is different from the second rate of decrease of the preference value provided by the second function;
generating, with the processor, a list of the plurality of content t that is stored on the storage unit, the list ordering the specific content among the plurality of content according to a magnitude of the preference value of the specific content computed by said step of computing; and
displaying the list of content on a screen.

8. The information processing method according to claim 7, wherein said step of computing uses the first function $F(t)=C1 \times t+D1$, where F is the preference value as a function of time, C1 is a predetermined constant that indicates a slope of a decrease of the preference value, and D1 is the preference value at a time instant when the specific content is recorded to the storage unit.

9. The information processing method according to claim 7, wherein the decrease of the preference value is faster for sports content than for movie content.

10. The information processing method according to claim 7, wherein the decrease of the preference value is faster for news content than for movie content.

11. The information processing method according to claim 7, wherein the decrease of the preference value is different depending on at least one of a time zone of a user, whether it is a holiday or a week day, or a day of the week.

12. The information processing method according to claim 7, wherein after the time instant of said step of viewing, the preference value is set to a lower value in a step, and is thereafter decreased less fast than before the step of viewing according to the second function.

13. A non-transitory computer readable recording medium having a program stored thereon, the program configured to perform a method on an information processing apparatus when executed on the information processing apparatus, the method comprising:

counting a time with a timer unit;

storing a plurality of content in a storage unit;

computing a preference value indicating a user preference of a specific content of the plurality of content, by using a first function that continuously decreases the preference value of the specific content as the time counted by the timer unit increases, wherein a first rate of decrease of the preference value provided by the first function is based on a genre of the specific content, when the specific content has not been reproduced, and by using a second function that continuously decreases the preference value assigned to the specific content as the time counted by the timer unit increases, wherein a second rate of decrease of the preference value provided by the second function is based on the genre of the specific content, when the specific content has been reproduced, and the first rate of decrease of the preference value provided by the first function is different from the second rate of decrease of the preference value provided by the second function;

generating a list of the plurality of content t that is stored on the storage unit, the list ordering the specific content among the plurality of content according to a magnitude of the preference value of the specific content computed by said step of computing; and displaying the list of content on a screen.

14. The non-transitory computer readable recording medium according to claim 13, wherein after the time instant of said step of viewing, the preference value is set to a lower value in a step, and is thereafter decreased less fast than before the step of viewing according to the second function.

\* \* \* \* \*